(No Model.) 2 Sheets—Sheet 1.

A. A. McINTOSH & L. J. LISHNESS.
Check Row Corn Planter.

No. 233,534. Patented Oct. 19, 1880.

WITNESSES:
Donn I. Twitchell,
C. Sedgwick.

INVENTOR:
A. A. McIntosh,
L. J. Lishness,
BY Munn & Co.
ATTORNEYS.

(No Model.) 2 Sheets—Sheet 2.

A. A. McINTOSH & L. J. LISHNESS.
Check Row Corn Planter.

No. 233,534. Patented Oct. 19, 1880.

WITNESSES:
H B Brown
W. W. Hollingsworth

INVENTOR:
A. A. McIntosh,
L. J. Lishness,
BY
ATTORNEYS.

June# UNITED STATES PATENT OFFICE.

ALFRED A. McINTOSH AND LYSANDER J. LISHNESS, OF PONTIAC, ILLINOIS.

CHECK-ROW CORN-PLANTER.

SPECIFICATION forming part of Letters Patent No. 233,534, dated October 19, 1880.

Application filed July 10, 1880. (No model.)

*To all whom it may concern:*

Be it known that we, ALFRED ALEXANDER MCINTOSH and LYSANDER JACOB LISHNESS, of Pontiac, in the county of Livingston and State of Illinois, have invented a new and useful Improvement in Check-Row Corn-Planters, of which the following is a specification.

Figure 1:
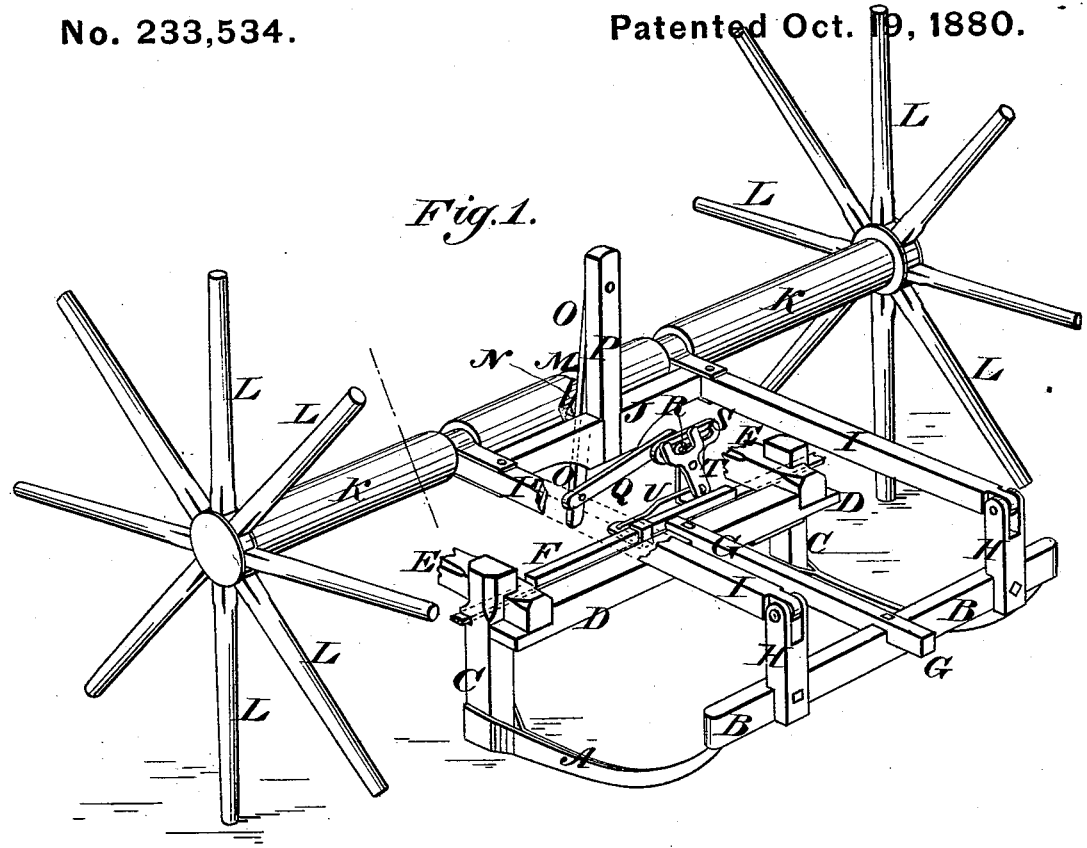
Figure 2:
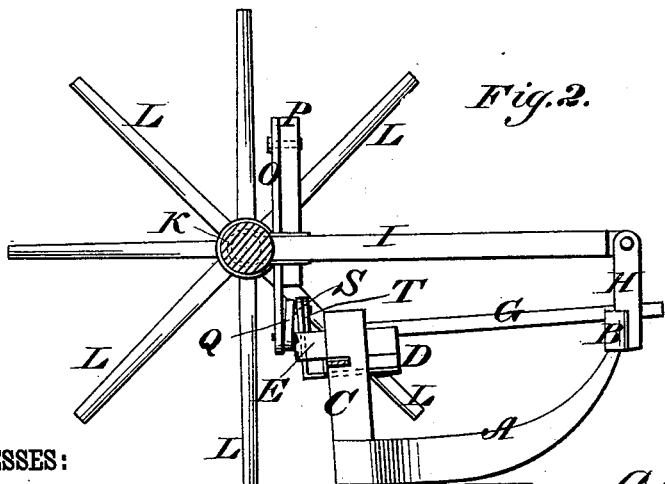
Figure 3:
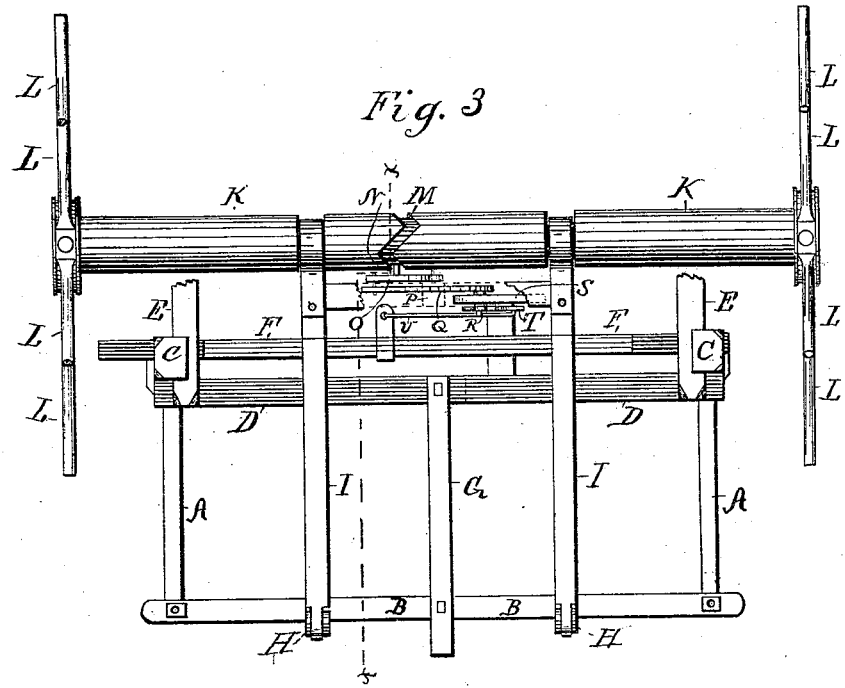
Figure 4:
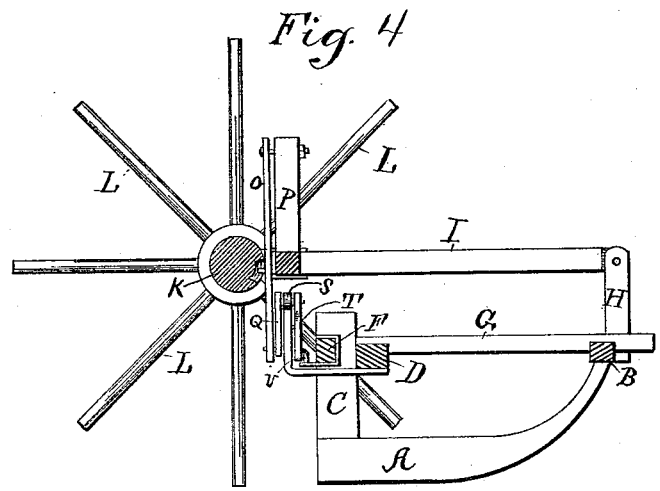

Figure 1 is a perspective view of the improvement. Fig. 2 is a sectional side elevation. Fig. 3 is a plan view, and Fig. 4 is a section taken on line $x\,x$ of Fig. 3.

Similar letters of reference indicate corresponding parts.

The object of this invention is to furnish check-row corn-planters so constructed as to drop the seed at uniform distances apart, and at the same time mark the position of the hills, so that the planting can be done in accurate check-row.

A represents the runners of a corn-planter, the forward ends of which are attached to and connected by a cross-bar, B.

To the rear ends of the runners A are attached the lower ends of the standards C, the upper ends of which are connected by a bar or board, D, which serves also as a platform to receive the seed-boxes, which seed-boxes are not shown in the drawings.

To the standards C or to the cross-bar D are attached the bars E, with the rear ends of which is connected the carriage of the planter.

The standards C are designed to be made hollow to serve as spouts to conduct the seed to the ground, or conducting-spouts may be connected with the said standards.

F is the slide by which the seed is removed from the seed-boxes and dropped to the ground in the ordinary manner.

G is the tongue to which the draft is applied, and which is attached to the centers of the cross-bars B D. As thus far described there is nothing new in the construction.

To the cross-bar B are attached the lower ends of two upright bars, H, to the upper ends of which are hinged the forward ends of two bars, I. The rear parts of the bars I are connected by a cross-bar, J, and to their rear ends are attached straps or other bearings, in which revolve the journals of the shaft K.

The shaft K is made of a length equal to twice the distance apart of the rows, and to each of its ends are attached eight (more or less) radial spokes, L, the outer ends of which come in contact with the ground, and thus revolve the shaft K as the planter is drawn forward. Around the center of the shaft K is formed a zigzag groove, M, to receive a pin, N, attached to the swinging bar O, the upper end of which is pivoted to the upper end of an upright bar, P.

The pin N may have a tubular washer or hollow roller placed upon it to lessen its friction against the sides of the zigzag groove M. The lower end of the upright P is rigidly attached to the center of the cross-bar J. The lower end of the swinging bar O is pivoted to the end of the bar Q, to the other end of which is attached a pin, R, provided with a tubular washer. The pin R passes through a guide-slot in the cross-head in the upper end of the bar S and enters the cavity of the forked upper end of the lever T. The lower part of the bar S is bent forward and is attached to the cross-bar D. The lever T is pivoted at its middle part to the bar S, and to its lower end is pivoted the end of the connecting-rod U, the other end of which is attached to the seed-dropping slide F, so that the seed-dropping slide F will be operated by the advance of the machine.

Having thus fully described our invention, we claim as new and desire to secure by Letters Patent—

The combination, with the shaft K, having the ordinary zigzag groove, and the swinging bar O, having pin N, working in said groove, of the bar Q, to which the bar O is pivoted at one end, and which is provided at the other with a pin, R, having a tubular washer, the bar S, having slot in its cross-head, and the lever T, having a forked upper end with a cavity, pivoted at the middle to said bar S and connected by rod U with the dropping-slide F, as and for the purpose specified.

ALFRED ALEXANDER McINTOSH.
LYSANDER JACOB LISHNESS.

Witnesses:
 A. THORNTON,
 E. N. SHROYER.